United States Patent
Ranjan

(10) Patent No.: US 8,682,812 B1
(45) Date of Patent: Mar. 25, 2014

(54) MACHINE LEARNING BASED BOTNET DETECTION USING REAL-TIME EXTRACTED TRAFFIC FEATURES

(75) Inventor: Supranamaya Ranjan, Albany, CA (US)

(73) Assignee: Narus, Inc., Sunnyvale, CA (US)

( * ) Notice: Subject to any disclaimer, the term of this patent is extended or adjusted under 35 U.S.C. 154(b) by 332 days.

(21) Appl. No.: 12/978,378

(22) Filed: Dec. 23, 2010

(51) Int. Cl.
- *G06N 7/00* (2006.01)
- *H04L 29/14* (2006.01)
- *G06F 15/18* (2006.01)
- *H04L 12/24* (2006.01)
- *H04L 29/06* (2006.01)

(52) U.S. Cl.
CPC .............. *G06N 7/005* (2013.01); *H04L 41/16* (2013.01); *H04L 63/1408* (2013.01)
USPC ........................................................ 706/12

(58) Field of Classification Search
CPC .... G06N 7/005; H04L 63/1408; H04L 41/16; G06K 9/6277
See application file for complete search history.

(56) References Cited

U.S. PATENT DOCUMENTS

| | | | | |
|---|---|---|---|---|
| 7,299,277 | B1* | 11/2007 | Moran et al. | 709/224 |
| 8,366,553 | B2* | 2/2013 | Kim et al. | 463/42 |
| 2008/0262990 | A1* | 10/2008 | Kapoor et al. | 706/20 |
| 2009/0003317 | A1* | 1/2009 | Kasralikar et al. | 370/352 |
| 2010/0095374 | A1* | 4/2010 | Gillum et al. | 726/22 |
| 2010/0138919 | A1* | 6/2010 | Peng et al. | 726/22 |
| 2010/0161537 | A1* | 6/2010 | Liu et al. | 706/46 |
| 2010/0162350 | A1* | 6/2010 | Jeong et al. | 726/1 |
| 2010/0284283 | A1* | 11/2010 | Golic et al. | 370/242 |
| 2011/0153811 | A1* | 6/2011 | Jeong et al. | 709/224 |
| 2011/0179492 | A1* | 7/2011 | Markopoulou et al. | 726/25 |

OTHER PUBLICATIONS

Masud et al, Flow-based Identification of Botnet Traffic by Mining Multiple Log Files, 2008.*
Gu et al, BotMiner: Clustering Analysis of Network Traffic for Protocol- and Structure-Independent Botnet Detection, 2008.*
Strayer et al, Botnet Detection Based on Network Behavior, 2008.*
Stokes et al, ALADIN: Active Learning of Anomalies to Detect Intrusion, 2008.*
Salvador et al, Framework for Zombie Detection using Neural Networks, 2009.*
Hugelshofer et al, OpenLIDS: A Lightweight Intrusion Detection System for Wireless Mesh Networks, 2009.*
Moore et al, Discriminators for use in flow-based classification, 2005.*

(Continued)

*Primary Examiner* — Alan Chen
*Assistant Examiner* — Mikayla Chubb
(74) *Attorney, Agent, or Firm* — Fernandez & Associates, LLP

(57) ABSTRACT

A method for identifying a botnet in a network, including analyzing historical network data using a pre-determined heuristic to determine values of a feature in the historical network data, obtaining a ground truth data set having labels assigned to data units in the historical network data identifying known malicious nodes in the network, analyzing the historical network data and the ground truth data set using a machine learning algorithm to generate a model representing the labels as a function of the values of the feature, analyzing real-time network data using the pre-determined heuristic to determine a value of the feature for a data unit in the real-time network data, assigning a label to the data unit by applying the model to the value of the feature, and categorizing the data unit as associated with the botnet based on the label.

15 Claims, 8 Drawing Sheets

(56) References Cited

OTHER PUBLICATIONS

Lividas et al, Using Machine Learning Techniques to Identify Botnet Traffic, 2006.*
Porras, Phillip, et al., "A Foray into Conficker's Logic and Rendezvous Points", Proceedings of LEET'09 Proceedings of the 2nd USENIX conference on Large-scale exploits and emergent threats: botnets, spyware, worms, and more, 2009, USENIX Association Berkeley, CA.
Faloutsos, Michalis, et al., "On Power-Law Relationships of the Internet Topology", ACM SIGCOMM '09: Proceedings of the Conference on Applications, Technologies, Architectures, and Protocols for Computer Communication, Sep. 1999, Harvard University Science Center, Cambridge, MA., 1999, pp. 251- 262, ACM, NY, NY.
Ramachandran, Anirudh, et al., "Revealing Botnet Membership Using DNSBL Counter-Intelligence", SRUTI'06 Proceedings of the 2nd conference on Steps to Reducing Unwanted Traffic on the Internet, vol. 2, 2006, USENIX Association, Berkeley, CA.
Seo, Jungtaek, et al. "Clustering-based Feature Selection for Internet Attack Defense", in International Journal of Future Generation Communication and Networking, Dec. 2008, vol. 1, No. 1, pp. 91-98.
Binkley, James, R., et al. "An Algorithm for Anomaly-based Botnet Detection", Proceedings of SRUTI '06, 2nd Workshop on Steps to Reducing Unwanted Traffic on the Internet, Jul. 7, 2006, San Jose, CA, 2006, pp. 43-48, USENIX Association, Berkeley, CA.
Gyongyi, Zoltan, et al., "Combating Web Spam with TrustRank", VLDB '04 Proceedings of the Thirtieth international conference on Very large data bases, 2004, vol. 30, pp. 576-587, published by VLDB Endowment.
Hall, Mark, et al., "The WEKA Data Mining Software: An Update", SIGKDD Explorations Newsletter (2009), vol. 11, Issue 1, pp. 10-18.
Ben-Gal, Irad, Bayesian Networks, entry in Ruggeri F, et al. (eds.), Encyclopedia of Statistics in Quality & Reliability, (2007), Wiley & Sons.
Fitzgibbon, Niall., et al. "Conficker.C : A Technical Analysis", Technical paper available online at <http://sophosnews.files.wordpress.com/2009/04/conficker-analysis.pdf> Retrieved Dec. 2010, published by SophosLabs, Sophos Inc., Apr. 1, 2009, pp. 1-16.
Goebel, Jan, et al., "Rishi: Identify Bot Contaminated Hosts by IRC Nickname Evaluation". Proceedings of First Workshop on Hot Topics in Understanding Botnets (HotBots 07), Cambridge, MA., Apr. 10, 2007, published by USENIX Association, Berkeley, CA.
Karasaridis, Anestis, et al, "Wide-scale Botnet Detection and Characterization", Proceedings of First Workshop on Hot Topics in Understanding Botnets (HotBots 07), Cambridge, MA., Apr. 10, 2007, published by USENIX Association, Berkeley, CA.
Livadas, Carl, et al., "Using Machine Learning Techniques to Identify Botnet Traffic", 2nd IEEE LCN Workshop on Network Security (WoNS'2006) Tampa, Florida, Nov. 2006, pp. 967-974.
Landwehrl, Niels, et al., "Logistic Model Trees", presented in Proceedings of the 14th European Conference on Machine Learning (Landwehr et al., 2003), published in extended version in 2006 by Kluwer Academic Publishers, Netherlands.
Mukkamala, Srinivas, et al., "Feature Selection for Intrusion Detection using Neural Networks and Support Vector Machines", Proceedings of IEEE International Joint Conference on Neural Networks, pp. 1702-1707, 2002.

Kohavi, Ron, "Scaling Up the Accuracy of Naive-Bayes Classifiers: a Decision Tree Hybrid", In Second International conference on Knowledge Discovery and Data Mining (KDD-96), Aug. 2-4, 1996, Portland, Oregon, pp. 202-207.
Rajab, Moheeb Abu, et al, "A Multifaceted Approach to Understanding the Botnet Phenomenon", Proceedings of ACM SIGCOMM/ USENIX Internet Measurement Conference (IMC), Oct. 25-27, 2006, Rio de Janeiro, Brazil.
Xu, Kuai, et al., "Profiling Internet BackboneTraffic: Behavior Models and Applications", SIGCOMM '05: Proceedings of the 2005 conference on Applications, technologies, architectures, and protocols for computer communications, Aug. 22-26, 2005, Philadelphia, PA, pp. 169-180, published by ACM, NY, NY, 2005.
Perdisci, Roberto, et al. "Behavioral Clustering of HTTP-Based Malware and Signature Generation Using Malicious Network Traces", Proceedings of USENIX Symposium on Networked Systems Design and Implementation, NSDI 2010, Apr. 2010.
Gu, Guofei, et al., "BotMiner: Clustering Analysis of Network Traffic for Protocol- and Structure-Independent Botnet Detection", Proceedings of the 17th USENIX Security Symposium (Security'08), San Jose, CA, 2008, pp. 139-154.
Cooke, Evan, et al. "The Zombie Roundup: Understanding, Detecting, and Disrupting Botnets", Proceedings of SRUTI '05—Steps to Reducing Unwanted Traffic on the Internet, Jul. 7, 2005, pp. 39-44, Cambridge, MA.
Gu, Guofei, et al., "BotSniffer: Detecting Botnet Command and Control Channels in Network Traffic.", Proceedings of the 15th Annual Network and and Distributed System Security Symposium (NDSS'08), San Diego, CA, Feb. 2008.
Rumelhart, D. E., "Learning internal representations by error propagation", in Rumelhart, D. E., et al (eds), Parallel distributed processing: explorations in the microstructures of cognition, chapter, 8, 1986, pp. 318-362, MIT Press Cambridge, MA.
Reiter, Michael K., et al. "Traffic Aggregation for Malware Detection", In DIMVA '08: Proceedings of the 5th International Conference on Detection of Intrusions and Malware, and Vulnerability Assessment, 2008, pp. 207-227, Springer-Verlag, Berlin, Heidelberg.
Choi, Hyunsang, et al., "Botnet Detection by Monitoring Group Activities in DNS Traffic", Proceedings of 7th IEEE International Conference on Computer and Information Technology, CIT 2007, Washington DC, Oct. 16-19, 2007, pp. 715-720, IEEE Computer Society.
Freund, Yoav et al., "The alternating decision tree learning algorithm", ICML '99: Proceedings of the Sixteenth International Conference, on Machine Learning, San Francisco, CA, Jun. 27-30, 1999, pp. 124-133, Morgan Kaufmann Publishers, Inc.
Krishnan. V., et al., "Web spam detection with anti-trust rank", Proceedings of 2nd International Workshop on Adversarial Information Retrieval on the Web, AIRWeb 2006, Aug. 10, 2006, Seattle, pp. 37-40.
Gu, G,Uofei et al., "BotHunter: Detecting Malware Infection Through IDS-Driven Dialog Correlation," Proceedings of 16th USENIX Security Symposium (Security '07), Aug. 2007. pp. 1-16, Aug. 6-10, 2007, Boston, MA.
John, P. J., et al. "Studying Spamming Botnets Using Botlab", Proceedings of NSDI '09: 6th USENIX symposium on Networked systems design and implementation, Apr. 22-24, 2009, pp. 291-306, Boston, MA.

* cited by examiner

MACHINE LEARNING BASED BOTNET DETECTION USING REAL-TIME EXTRACTED TRAFFIC FEATURES

CROSS REFERENCE TO RELATED APPLICATIONS

This application is related to co-pending U.S. patent application Ser. No. 12/985,263, filed on Jan. 5, 2011, and entitled "MACHINE LEARNING BASED BOTNET DETECTION USING REAL-TIME CONNECTIVITY GRAPH BASED TRAFFIC FEATURES," also assigned to the assignee of the present application and incorporated herein by reference.

BACKGROUND OF THE INVENTION

1. Field of the Invention

The present invention relates to computers and computer networks. More particularly, the invention relates to detecting malicious activities in the computer network.

2. Background of the Related Art

The term "botnet" refers to a collection of malicious software agents (referred to as robots) that run autonomously and automatically. The term "botnet" can also be used to refer to a collection of compromised computers (referred to as bots) each infected with one or more of such malicious software agents. For example, the infection may be a result of installation via drive-by downloads exploiting web browser vulnerabilities, worms, Trojan horses, or backdoors, under a common command-and-control infrastructure. Typically, the owner (i.e., originator, operator, or controller) of a botnet uses the botnet to coordinate spam campaigns, launch denial-of-service attacks, or steal sensitive information. Several botnets have been found and removed from the Internet. The Dutch police found a 1.5 million node botnet and the Norwegian ISP (Internet service provider) Telenor disbanded a 10,000-node botnet. Large coordinated international efforts to shut down botnets have also been initiated. It has been estimated that up to one quarter of all personal computers connected to the internet may be part of a botnet.

A botnet's originator can control the bots remotely, usually through a means such as IRC (Internet Relay Chat), from a command-and-control (C&C) server. Though rare, more experienced botnet operators program their own commanding protocols from scratch. For example, these protocols may include a server program for C&C and a client program for operation that embeds itself on the victim's machine (i.e., bot). Both programs usually communicate with each other over a network using a unique encryption scheme for stealth and protection against detection or intrusion into the botnet network.

Generally, detection of C&C channels is difficult for many reasons, including: 1) the use of HTTP protocols to bypass firewalls, 2) encryption to obscure payloads, and 3) "domain fast-flux," i.e., constantly changing locations of command-and-control servers. Existing approaches that look for payload signatures can be easily defeated by encryption or obfuscation techniques. Techniques that identify periodic, beaconing traffic have difficulty in real traffic traces due to very high background noise levels and random timing perturbations introduced by new botnets. There are also practical limitations to collecting detailed flow data at high speed routers which can introduce unacceptable overhead on the network.

SUMMARY

In general, in one aspect, the invention relates to a method for identifying a botnet in a network. The method includes obtaining historical network data in the network, the historical network data comprising a first plurality of data units, analyzing, by a central processing unit (CPU) of a computer and using a pre-determined heuristic, the historical network data to determine a plurality of values of a feature for the first plurality of data units, wherein a first value of the feature for a first data unit of the first plurality of data units is determined based on at least a portion of the historical network data associated with the first data unit, obtaining a ground truth data set associated with the historical network data, the ground truth data set comprising a plurality of labels with each label assigned to a corresponding data unit of the first plurality of data units, said each label comprising one of a first label categorizing said corresponding data unit as associated with the botnet and a second label categorizing said corresponding data unit as being not associated with the botnet, analyzing, by the CPU and using a machine learning algorithm, the historical network data and the ground truth data set to generate a model representing the plurality of labels as a function of the plurality of values of the feature, obtaining real-time network data in the network, the real-time network data comprising a second plurality of data units, analyzing, by the CPU and using the pre-determined heuristic, the real-time network data to determine a second value of the feature for a second data unit of the second plurality of data units, wherein the second value is determined based on at least a portion of the real-time network data associated with the second data unit, assigning a third label to the second data unit by applying the model to the second value of the feature, and categorizing the second data unit as associated with the botnet based on the third label.

In general, in one aspect, the invention relates to a system for identifying a botnet in a network. The system includes a processor and memory storing instructions. The instruction, when executed by the processor, include functionalities for obtaining historical network data in the network, the historical network data comprising a first plurality of data units, analyzing, using a pre-determined heuristic, the historical network data to determine a plurality of values of a feature for the first plurality of data units, wherein a first value of the feature for a first data unit of the first plurality of data units is determined based on at least a portion of the historical network data associated with the first data unit, obtaining a ground truth data set associated with the historical network data, the ground truth data set comprising a plurality of labels with each label assigned to a corresponding data unit of the first plurality of data units, said each label comprising one of a first label categorizing said corresponding data unit as associated with the botnet and a second label categorizing said corresponding data unit as being not associated with the botnet, analyzing, using a machine learning algorithm, the historical network data and the ground truth data set to generate a model representing the plurality of labels as a function of the plurality of values of the feature, obtaining real-time network data in the network, the real-time network data comprising a second plurality of data units, analyzing, using the pre-determined heuristic, the real-time network data to determine a second value of the feature for a second data unit of the second plurality of data units, wherein the second value is determined based on at least a portion of the real-time network data associated with the second data unit, assigning a third label to the second data unit by applying the model to the second value of the feature, and categorizing the second data unit as associated with the botnet based on the third label.

In general, in one aspect, the invention relates to a non-transitory computer readable medium storing instructions for identifying a botnet in a network. The instructions when executed by a processor of a computer includes functionality for obtaining historical network data in the network, the historical network data comprising a first plurality of data units, analyzing, using a pre-determined heuristic, the historical network data to determine a plurality of values of a feature for the first plurality of data units, wherein a first value of the feature for a first data unit of the first plurality of data units is determined based on at least a portion of the historical network data associated with the first data unit, obtaining a ground truth data set associated with the historical network data, the ground truth data set comprising a plurality of labels with each label assigned to a corresponding data unit of the first plurality of data units, said each label comprising one of a first label categorizing said corresponding data unit as associated with the botnet and a second label categorizing said corresponding data unit as being not associated with the botnet, analyzing, using a machine learning algorithm, the historical network data and the ground truth data set to generate a model representing the plurality of labels as a function of the plurality of values of the feature, obtaining real-time network data in the network, the real-time network data comprising a second plurality of data units, analyzing, using the pre-determined heuristic, the real-time network data to determine a second value of the feature for a second data unit of the second plurality of data units, wherein the second value is determined based on at least a portion of the real-time network data associated with the second data unit, assigning a third label to the second data unit by applying the model to the second value of the feature, and categorizing the second data unit as associated with the botnet based on the third label.

Other aspects and advantages of the invention will be apparent from the following description and the appended claims.

DETAILED DESCRIPTION

Figure 1:
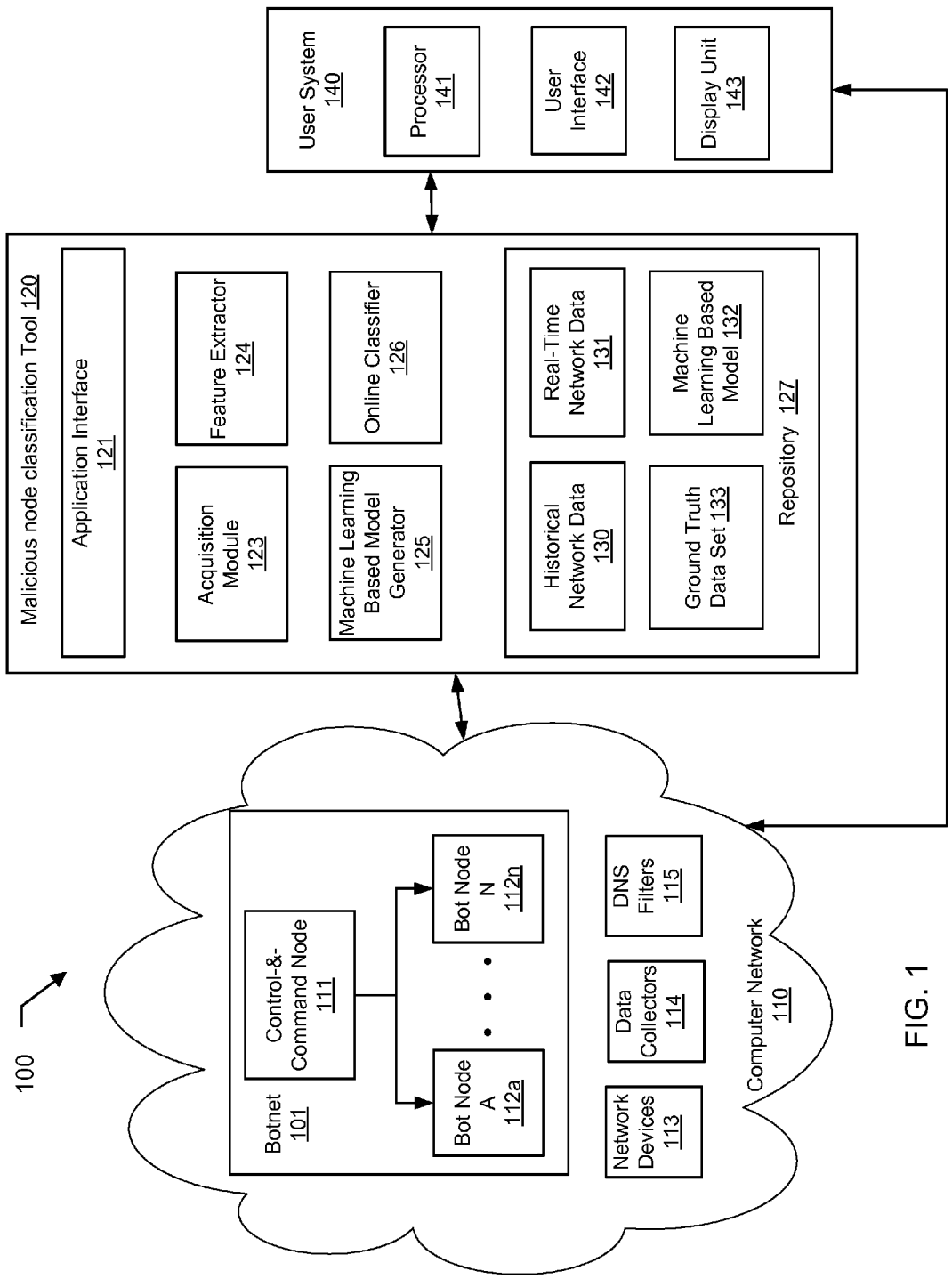
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention address the problem of detecting bots in network traffic based on a classification model learned using machine learning algorithms based on features extracted from historical network data and applying the learned classification model to features extracted in real-time from current network data. In one or more embodiments, the features may be derived based on characteristics of data units (e.g., layer-3 packets and/or layer-4 flows) in the network data. Throughout this disclosure, the term "layer-4 flow" and "flow" may be used interchangeably depending on the context and refers to the connection between a pair of IP addresses. In one or more embodiments, flows are categorized based on flow tuples. For example, a flow tuple may be in the format of <source IP address, destination IP address, destination port, protocol>. Other formats may also be used for the flow tuple. In an example embodiment, 29 layer-4 traffic features are included in the flow tuple, such as bytes per second, packets per flow, inter-arrival times, etc. associated with the flow. In one or more embodiments, supervised models based on Elastic-Net regularized Logistic Regression and Logistic Model Trees are used to identify which features are more discriminative than others and how much of classification accuracy can be gained by incorporating non-linearity in feature space.

Generally, an intrusion prevention system (IPS) or intrusion detection system (IDS) of a network may be based signature-based detection while a honeypot is a trap set to detect, deflect, or in some manner counteract attempts at unauthorized access to the network. Generally it consists of a computer, data, or a network site that appears to be part of the network and contain information or a resource of value to attackers, but is actually isolated and monitored.

In one or more embodiments, the supervised machine learning based method for online detection of bots using streaming layer-3/layer-4 information includes (i) using external blacklists (e.g., honeypots and IPS/IDS systems) to provide information (i.e., ground truth data set) about currently known bots and C&C servers, (ii) computing the aforementioned features for both legitimate and malicious nodes during a training phase based on the ground truth data set, (iii) training models using the following machine learning algorithms: Logistic Regression, Logistic Model Tree, Bayesian network, Multi-layer perceptron, Decision tree, Alternating Decision Tree, and Naives Bayes Tree, and (iv) computing the features for new and not yet labeled data units (e.g., flow tuples) during an online phase (i.e., real-time detection phase) and applying the trained model to determine whether activities associated with these data units (e.g., flow tuples) reflect botnet communication or legitimate activity. Accordingly, a data unit (e.g., flow tuple) may be dynamically labeled as malicious (i.e., associated with a botnet as a bot or C&C server) or legitimate/non-malicious (i.e., not associated with a botnet) as it is observed for the first time in real-time network traffic data or as additional traffic data involving it is observed.

For example, web traffic data collected at the Security Operation Center (SoC) of a Tier-1 ISP may be analyzed using the method described above. This SoC was designed such that a copy of all traffic on commonly occurring HTTP ports (80, 8000, 8080, 443) is forwarded from the routers via port-mirroring to the SoC. In other examples, network traffic data associated with other types of traffic in addition to HTTP traffic may also be analyzed using the method described above.

Given the dynamic nature of botnets, embodiments of the invention re-learn new machine learning models over time, utilizing continually updated lists of known bots for training. In this regards, the classifier is retrained and the learned model is to keep pace with the changing botnet behavior.

FIG. 1 shows a diagram of a system (100) for machine learning based botnet detection using real-time extracted features in accordance with one or more embodiments. The system (100) includes a malicious node classification tool (120), a user system (140), and a computer network (110). The malicious node classification tool (120) includes storage repository (127), one or more application interfaces (121), acquisition module (123), feature extractor (124), machine learning based model generator (125), and online classifier (126). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, a portion of the computer network (110) may be infected by malicious programs to form a botnet (101) including a control-and-command (C&C) node (111) and one or more bot nodes (e.g., bot node A (112a), bot node N (112n), etc.). Generally, the botnet (101) may cause additional malicious activities to affect and/or infect other network devices (e.g., network devices (113)) within the computer network (110). In one or more embodiments, certain device(s) (e.g., data collectors (114)) within the computer network (110) may be configured to collect network data (not shown) for providing to the malicious node classification tool (120). In one or more embodiments, certain device(s) (e.g., DNS filters (115)) within the computer network (110) may be configured to sanction (e.g., passing or blocking) network traffic (e.g., DNS queries, not shown) based on information from the malicious node classification tool (120). The C&C node (111), bot node A (112a), bot node N (112n), and network devices (113) are generally referred to as nodes of the computer network (110). Each of these components is described below. One of ordinary skill in the art will appreciate that embodiments are not limited to the configuration shown in FIG. 1.

In one or more embodiments of the invention, the malicious node classification tool (120) is configured to interact with the computer network (110) using one or more of the application interface(s) (121). The application interface (121) may be configured to receive data (e.g., network traffic data, not shown) from the computer network (110) and/or store received data to the storage repository (127). Such network data captured over a time period (e.g., an hour, a day, a week, etc.) is referred to as trace or network trace. Network trace contains data units (e.g., IP addresses, flow tuples, domain names, etc.) related to communications between nodes in the computer network (110). Further, the network trace may be associated with only time period in the past and is referred to as historical network data. Alternatively, the network trace may be updated continuously from a starting time point and is referred to as real-time network data. For example, the real-time network data may have a fixed static starting time point or may encompass a fixed time interval with a dynamically changing starting time point. For example, the network trace may be captured on a routine basis using the data collectors (114) and selectively sent to the application interface (121) from time to time to be formatted and stored in the repository (127) for analysis. For example, the data collectors (114) may be a packet analyzer, network analyze, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the malicious node classification tool (120).

In one or more embodiments, the application interface (121) may be configured to provide data (e.g., alert or other results) and/or instruction (e.g., to initiate a network security operation) from the malicious node classification tool (120) to the computer network (110). For example, an alert identifying detected malicious node names or an instruction to block malicious traffic may be provided via the application interface (121) to the DNS filters (115). For example, the DNS filters (115) may include a DNS server configured to block certain domain names by specifying the blocked domain names in the DNS server policy, i.e., domain blacklisting. Further, the DNS filters (115) may include a network router that intercept and selectively block DNS traffic (e.g., DNS queries and/or replies) passing over the computer network (110) or a portion thereof. In particular, the identified malicious node name may be used to facilitate the identification of a source node in the computer network (110) that sends one or more DNS queries of such malicious domain names. For example, once a malicious domain name is determined, the DNS flows/packets may be reviewed to determine which client in the network initiated the relevant DNS query: (1) the querier may be a DNS resolver acting on behalf of the actual client (i.e., source node) or (2) it may be the actual client (i.e., source node) which sent the query directly to the DNS server. In case (1) above, the logs maintained at the particular DNS resolver may be reviewed to find out the IP address of the client (i.e., source node) which actually contacted this resolver and be identified as a bot.

Accordingly, one or more network router(s) located logically between the DNS server and the source node (e.g., a bot) sending the malicious DNS queries may be configured to act as the DNS filters (115) blocking such bot-generated DNS queries. In one or more embodiments, the DNS filters (115) may be configured in the computer network (110) by a network communication service provider (e.g., ISP), a network security service provider, or other business or government entities. In one or more embodiments, the malicious node classification tool (120) is configured to support various data formats provided by the computer network (110).

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the malicious node classification tool (120). The user may include, but is not limited to, an individual, a group, an organization, or some other entity having authority and/or responsibility to access the malicious node classification tool (120). Specifically, the context of the term "user" here is distinct from that of a user of the computer network (110). The user system (140) may be, or may contain a form of, an internet-based communication device that is capable of communicating with the application interface (121) of the malicious node classification tool (120). Alternatively, the malicious node classification tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the malicious node classification tool (120) (e.g., report, alert, etc.).

As shown, communication links are provided between the malicious node classification tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the malicious node classification tool (120), the user system (140), and the communication links may be part of the computer network (110).

In one or more embodiments, a central processing unit (CPU, not shown) of the malicious node classification tool (120) is configured to execute instructions to operate the components of the malicious node classification tool (120) (e.g., storage repository (127), the application interface (121), the acquisition module (123), and the online classifier (126)). In one or more embodiments, the memory (not shown) of the malicious node classification tool (120) is configured to store software instructions for analyzing the network trace to extract features, generating classification models, and classifying data units (e.g., IP addresses, flow tuples, domain names, etc.) in the network trace as malicious or legitimate. The memory may be one of a variety of memory devices, including but not limited to random access memory (RAM), read-only memory (ROM), cache memory, and flash memory. The memory may be further configured to serve as back-up storage for information stored in the storage repository (127).

In one or more embodiments, the malicious node classification tool (120) is configured to obtain and store data in the storage repository (127). In one or more embodiments, the storage repository (127) is a persistent storage device (or set of devices) and is configured to receive data from the computer network (110) using the application interface (121). The storage repository (127) is also configured to deliver working data to, and receive working data from, the acquisition module (123), feature extractor (124), machine learning based model generator (125), and online classifier (126). The storage repository (127) may be a data store (e.g., a database, a file system, one or more data structures configured in a memory, some other medium for storing data, or any suitable combination thereof), which may include information (e.g., historical network data (130), real-time network data (131), ground truth data set (133), machine learning based model (132), etc.) related to the malicious node classification. The storage repository (127) may be a device internal to the malicious node classification tool (120). Alternatively, the storage repository (127) may be an external storage device operatively connected to the malicious node classification tool (120).

In one or more embodiments, the malicious node classification tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the malicious node classification tool (120) is configured to support various data formats provided by the user system (140).

In one or more embodiments, the malicious node classification tool (120) includes the acquisition module (123) that is configured to obtain network trace from the computer network (110), for example via data collectors (114). In one or more embodiments, the acquisition module (123) works in conjunction with the data collectors (114) to parse data packets and collate data packets belonging to the same flow tuple (e.g., defined by a source IP address, destination IP address, etc.). For example, such network trace may then be stored in the repository (127) as historical network data (130) and/or real-time network data.

In one or more embodiments, the acquisition module (123) is further configured to obtain external blacklists that provide information regarding what server domains or IP addresses are known to be malicious and/or whitelists that provide information regarding what server domains or IP addresses are known to be non-malicious. For example, such blacklists and whitelists may include publically available lists or confidential lists of known bots and known non-malicious nodes, respectively, and may be stored in the repository (127) as part of the ground truth data set (133). For example, the ground truth data set (133) may be based on an IP blacklist and a IP whitelist where data units in the ground truth data set associated with one or more IP address in the IP blacklist are labeled as "malicious" while data units in the ground truth data set associated with one or more IP address in the IP whitelist are labeled as "non-malicious". In another example, an IP blacklist is used as the ground truth data set in which case all data units associated with one or more IP address in the IP blacklist are labeled as "malicious" and the ground truth data set does not include any non-malicious data units.

In one or more embodiments, the malicious node classification tool (120) includes the feature extractor (124) that is configured to analyze, using one or more pre-determined heuristic, a network trace (e.g., the historical network data (130), real-time network data (131), etc.) to determine values of a feature for data units in the network trace. In one or more embodiments, such analysis may be performed for layer-4 features such as bytes per second, packets per flow, inter-arrival times, etc. associated with flow tuples extracted from the network trace.

In one or more embodiments, the malicious node classification tool (120) includes the machine learning based model generator (125) that is configured to analyze, using a machine learning algorithm, the historical network data (130) and the ground truth data set (133) to generate a classification model. In one or more embodiments, the ground truth data set (133) and the historical network data (130) associated with a same time interval may be matched to identify a correspondence between known bots in the ground truth data set (133) and data units (e.g., IP addresses, flow tuples, domain names, etc.) in the historical network data (130). In one or more embodiments, such matching may be performed by the machine learning based model generator (125) to generate a label for a data unit in the historical network data (130) specifying the data unit as either malicious or legitimate (i.e., not malicious). In one or more embodiments, the machine learning based model generator (125) uses one or more machine learning (or supervised learning) algorithm to learn the relationship between the labels and feature values (i.e., extracted by the feature extractor (124)) across data units in the historical network data (130) and thereby generating the classification model to statistically represent the labels of the data units as a function of the values of the feature for the data units.

In one or more embodiments, the malicious node classification tool (120) includes the online classifier (126) that is configured to assign a label to each data unit in the real-time network data (131) by applying the classification model to the feature values (i.e., extracted by the feature extractor (124)) across all data units in the real-time network data (131) and thereby categorizing each data unit as associated with a botnet or not.

More details of extracting features, generating classification models, and classifying data units in the real-time network data are described in reference to FIGS. 2-4 below.

The malicious node classification tool (120) may include one or more system computers, which may be implemented as a server or any conventional computing system However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, minicomputers, mainframe computers, and the like.

While specific components are depicted and/or described for use in the units and/or modules of the malicious node classification tool (120), it will be appreciated that a variety of components with various functions may be used to provide the formatting, processing, utility and coordination functions necessary to modify various working data used by the malicious node classification tool (120). The components may have combined functionalities and may be implemented as software, hardware, firmware, or combinations thereof.

Figure 2:
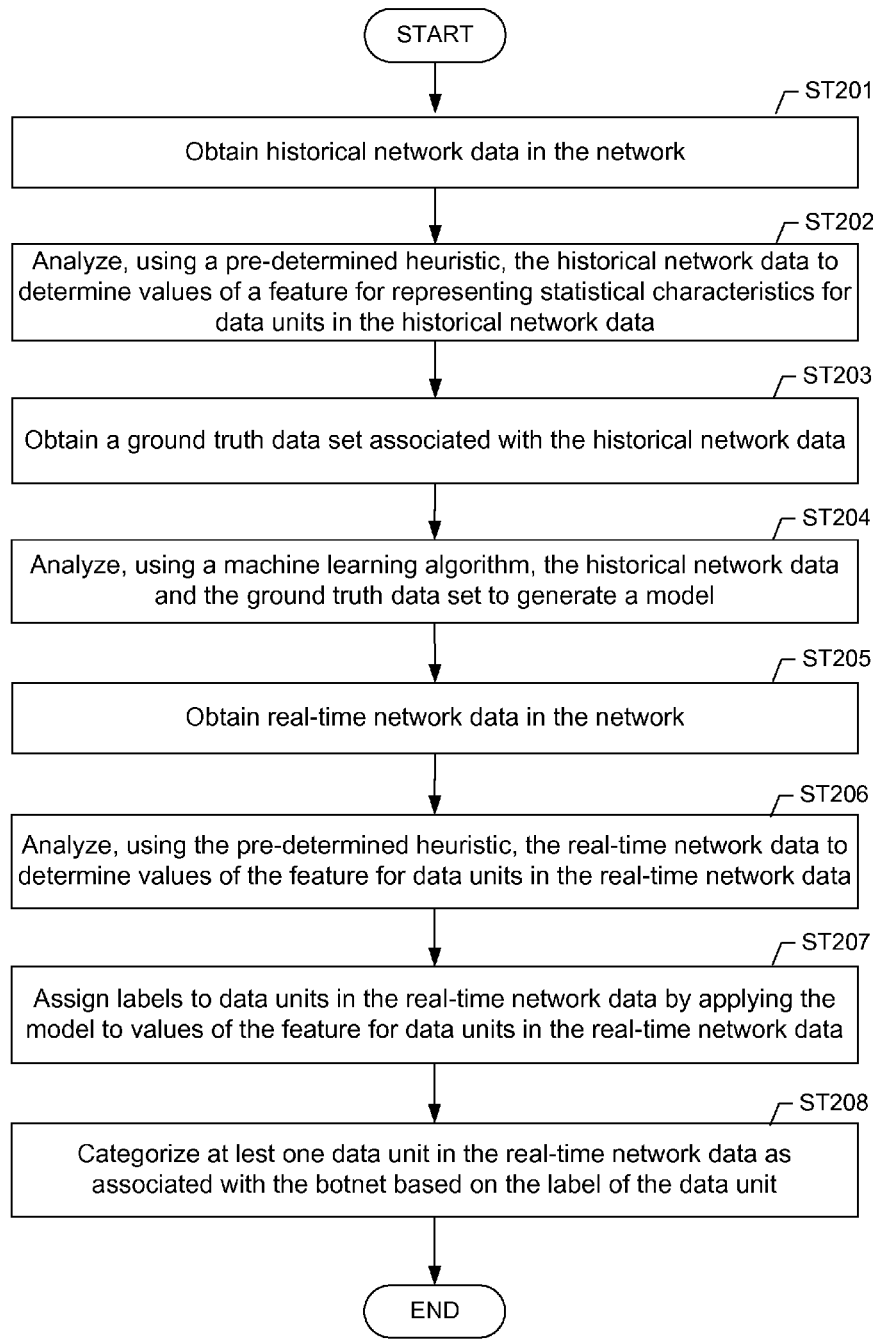
FIG. 2 shows a method flow chart according to aspects of the invention.

FIG. 2 depicts a method flowchart of methods in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1 above.

In one or more embodiments of the invention, a network trace is obtained for analysis from a computer network (e.g., Internet). For example, the network trace may be captured by a packet analyzer, network analyze, protocol analyzer, sniffer, netflow device, semantic traffic analyzer (STA), or other types of data collection device and represents a portion of the network data in the network observable by such data collection device. Further, the network trace may include real-time network data captured in real-time or historical network data previously captured in the computer network. In addition, the real-time network data and/or the historical network data may be a portion of the captured network trace based on a pre-determined sampling criterion to reduce the amount of data processing requirement during analysis.

In one or more embodiments, the real-time network data and/or the historical network data is captured on a periodic basis (e.g., every minute, hourly, daily, etc.) or in response to an event (e.g., observation or elimination of botnet or spam activity). In one or more embodiments, the real-time network data and/or the historical network data is obtained on a periodic basis based on a recurring time window (e.g., every minute, hourly, daily, weekly, monthly, etc.). For example, network data obtained within each of the recurring time windows in the past may be considered as different versions of the historical network data. Throughout this disclosure, the term "recurring time window" may be referred to as "time window" based on context. Further, the most current one of the recurring time windows is referred to as the current time window. In one or more embodiments, the historical network data obtained in the time window immediately prior to the current time window is analyzed to generate a classification model for labeling data units of the real-time network data obtained in the current time window. In one or more embodiments, several versions of the historical network data may be combined based on a statistical averaging scheme to be analyzed to generate the classification model.

In one or more embodiments, the network trace may be updated continuously from a starting time point to be included as real-time network data. For example, the real-time network data may have a fixed static starting time point or may encompass a fixed time interval (e.g., the same as the recurring time window) with a dynamically changing starting time point. In one or more embodiments, the real-time network data includes only network data obtained within the current time window that is analyzed for labeling data units contained therein based on the classification model (e.g., generated from historical network data obtained in the immediately prior time window). In one or more embodiments, the real-time network data includes network data obtained within a pre-determined number (denoted as n) of consecutive time windows including the current time window for performing analysis based on a statistical averaging scheme. In such embodiments, the historical network data may be obtained within the pre-determined number of consecutive time windows immediately prior to the current time window based on the same statistical averaging scheme. Said in other words, the real-time network data may include n−1 number of most recent versions of historical network data while the classification model is generated based on n number of most recent versions of historical network data.

In one or more embodiments, the method of FIG. 2 is configured to generate the classification model using machine learning algorithms based on features extracted from historical network data. Further, the method is configured to label data units (e.g., flow tuples) in the real-time network data by applying the learned classification model to features extracted in real-time from the real-time network data.

As shown in FIG. 2, initially in Step 201, historical network data is obtained in the network. For example, the historical network data includes data units such as IP addresses, flow tuples, domain names, etc. In particular, IP addresses are associated with nodes in the network acting as sources or destinations of the flows where a flow may link a client identified by an IP address and a server of a domain identified by a domain name. In one or more embodiments, data units relate to all flows observed during one or more of the aforementioned recurring time windows immediately prior to the current time window are captured into the historical network data for analysis during the steps below. Accordingly, as the current time window expires into a prior time window in the past, data units relating to all flows observed during the expiring current time window become part of a new version of the historical network data replacing the previous version for analysis during the steps below.

In Step 202, the historical network data is analyzed, using a pre-determined heuristic, to determine values of a feature for the data units in the historical network data. For example, the data units may include layer-4 flow tuples each associated with a flow tuple <source IP address, destination IP address, destination port, protocol> in which case a value of the feature for a particular flow tuple may be determined based on a portion of the historical network data associated with the particular flow tuple. For example, the value of the feature for the particular flow tuple may be determined based on those layer-4 flows having the particular combination of source IP address, destination IP address, destination port, and protocol identifier that are the same as those of the particular flow tuple. The example feature may include one or more metric of the flow such as bytes per second, packets per flow, inter-arrival times, etc. listed in TABLE 1 below. In one or more embodiments, the metrics listed in TABLE 1 are based on a pre-determined time interval where appropriate. For example, number of bytes in backward direction may correspond to one of the aforementioned recurring time windows.

In one or more embodiments, the values of the feature are time dependent and comprise a first set of values corresponding to a first version of the historical network data within a first time window and a second set of values corresponding to a second version of the historical network data within a second time window. For example, the first time window and the second time window may be consecutive time windows of the aforementioned recurring time windows while the first version and the second version correspond to different versions of the historical network data. Further, the first and second sets of values are represented as first and second matrices from which a time averaged matrices may be generated based on a pre-determined statistical formula, such as exponentially weighted moving average (EWMA) formula. Accordingly, the values of the feature are determined for the data units (e.g., flow tuples) based on the time averaged matrix. In one or more embodiments, the EWMA formula includes matrix versions generated from two or more consecutive recurring time windows. More details of the time averaged matrices and the EWMA formula are described in reference to FIG. 3A-4 below.

In Step 203, a ground truth data set associated with the historical network data is obtained. In one or more embodiments, the ground truth data set includes labels each assigned to a corresponding data unit in the historical network data. Specifically, each label categorizes the corresponding data unit as malicious (i.e., associated with a botnet) or as legitimate (i.e., not malicious or not associated with a botnet). For example, the ground truth data set may be publically available or confidentially maintained blacklists identifying known botnets, whitelists identifying known non-malicious nodes, or combinations of blacklists and whitelists. In one or more embodiments, the ground truth data set is updated up to the same time window as the historical network data. Said in other words, the ground truth data set reflects the botnet activities during the time window when the historical network data is captured.

In Step 204, the historical network data and the ground truth data set are analyzed for those data units found in both historical network data and the ground truth data set. Specifically, the analysis uses a machine learning algorithm to generate a model that statistically predicts (i.e., models) the labels (denoted as Y) of the data units in the ground truth data set as a function (denoted as f(X)) of the values (denoted as X) of the feature of the corresponding data units calculated using the historical network data. X may have a scalar value if the feature includes only one metric or have a vector value if the feature includes multiple metrics (e.g., one or more of the metrics listed in TABLE 1). For example, data unit $FT_1$ (e.g., a particular flow tuple) may be found in both the historical network data as well as the ground truth data set. The feature value of $FT_1$ may be calculated as $x.FT_1$ based on characteristics of the historical network data. The label of the data unit $FT_1$ may be "malicious" based on the ground truth data set. The machine learning algorithm is configured to adjust the model such that a prediction of the model based on $f(x.FT_1)$ matches the actual known label of "malicious" for the data unit $FT_1$ in the ground truth data set within a pre-determined statistical range. For example, the statistical range may be represented based on statistical parameters such as recall, precision, or F-measure described in reference to FIG. 4 below.

Similarly, data unit $FT_2$ (e.g., another flow tuple) found in both the historical network data as well as the ground truth data set. The feature value of $FT_2$ may be calculated as $x.FT_2$ based on characteristics of the historical network data. The label of the data unit $FT_2$ may be "non-malicious" based on the ground truth data set. The machine learning algorithm is configured to adjust the model such that a prediction of the model based on $f(x.FT_2)$ matches the actual known label of "non-malicious" for the data unit $FT_2$ in the ground truth data set within a pre-determined statistical range. In one or more embodiments, the ground truth data set is based on an IP blacklist where data units in the ground truth data set associated with one or more IP address in the IP blacklist are labeled as "malicious" while data units in the ground truth data set not associated with one or more IP address in the IP blacklist are labeled as "non-malicious". In one or more embodiments, an IP blacklist is used as the ground truth data set in which case all data units associated with one or more IP address in the IP blacklist are labeled as "malicious".

In one or more embodiments, the machine learning algorithm may include, but not limited to, Bayesian network, multi-layer perceptron, alternating decision tree, Naive Bayesian tree, or variations thereof.

In Step 205, real-time network data is obtained in the network. In particular, the real-time network data includes same types of data units as those contained in the historical network data, such as IP addresses, flow tuples, domain names, etc. In one or more embodiments, data units relate to all flows observed during the current time window are captured into the real-time network data for feature extraction. Accordingly, as the current time window expires into a prior time window in the past, the real-time network data captured during the expiring current time window becomes a new version of the historical network data and is replaced by a new version of real-time network data to be captured in the upcoming current time window.

In Step 206, the real-time network data is analyzed based on the same pre-determined heuristic used in Step 202 above to determine values of the feature for data units of the real-time network data. As described above, the data units in the real-time network data may be layer-4 flow tuples while the feature of a data unit may be extracted based on a portion of the real-time network data associated with the particular data unit. Specifically, the feature of a particular flow tuple may be extracted based on statistical metrics of those layer-4 flows associated with the particular flow tuple in the real-time network data. In particular, the feature may be the same type of feature described in Step 202. For example, the feature may include bytes per second, packets per flow, inter-arrival times, etc. listed in TABLE 1 below.

In one or more embodiments, the real-time network data captured in the current time window may be statistically combined with one or more most recent versions of historical network data for analysis in Step 206.

In Step 207, a label is assigned to a data unit in the real-time network data by applying the model to the value of the feature of the data unit as determined in Step 206 above. Applying the model includes substituting X by the value of the feature determined in Step 206 as input into the aforementioned function f(X) to generate the output as a label assigned to the corresponding data unit. For example, the feature value of data unit $FT_3$ (e.g., a particular flow tuple) found in the real-time network data may be calculated as $x.FT_3$ based on characteristics of a portion of the real-time network data associated with $FT_3$. The label of the data unit $FT_3$ is then assigned as $f(x.FT_3)$, which is calculated based on the model regardless of whether $FT_3$ is or is not found in either the historical network data or the ground truth data set. For example, the label $f(x.FT_3)$ may be malicious or legitimate. In the case that $f(x.FT_3)$ is malicious, the data unit $FT_3$ is categorized (i.e., classified) as associated with a botnet in Step 208.

Figure 3A:
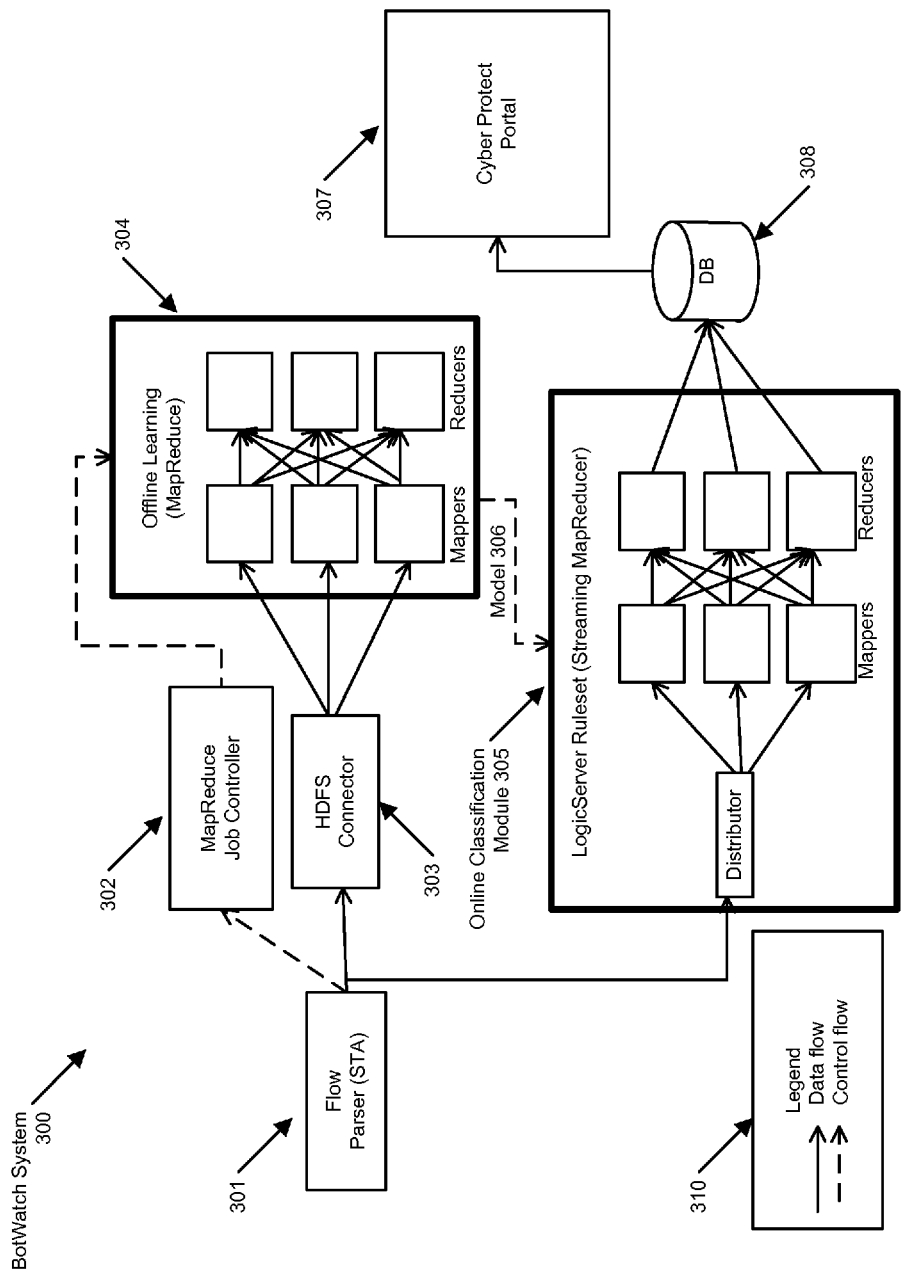
FIGS. 3A-3D show an example according to aspects of the invention.
Figure 3B:
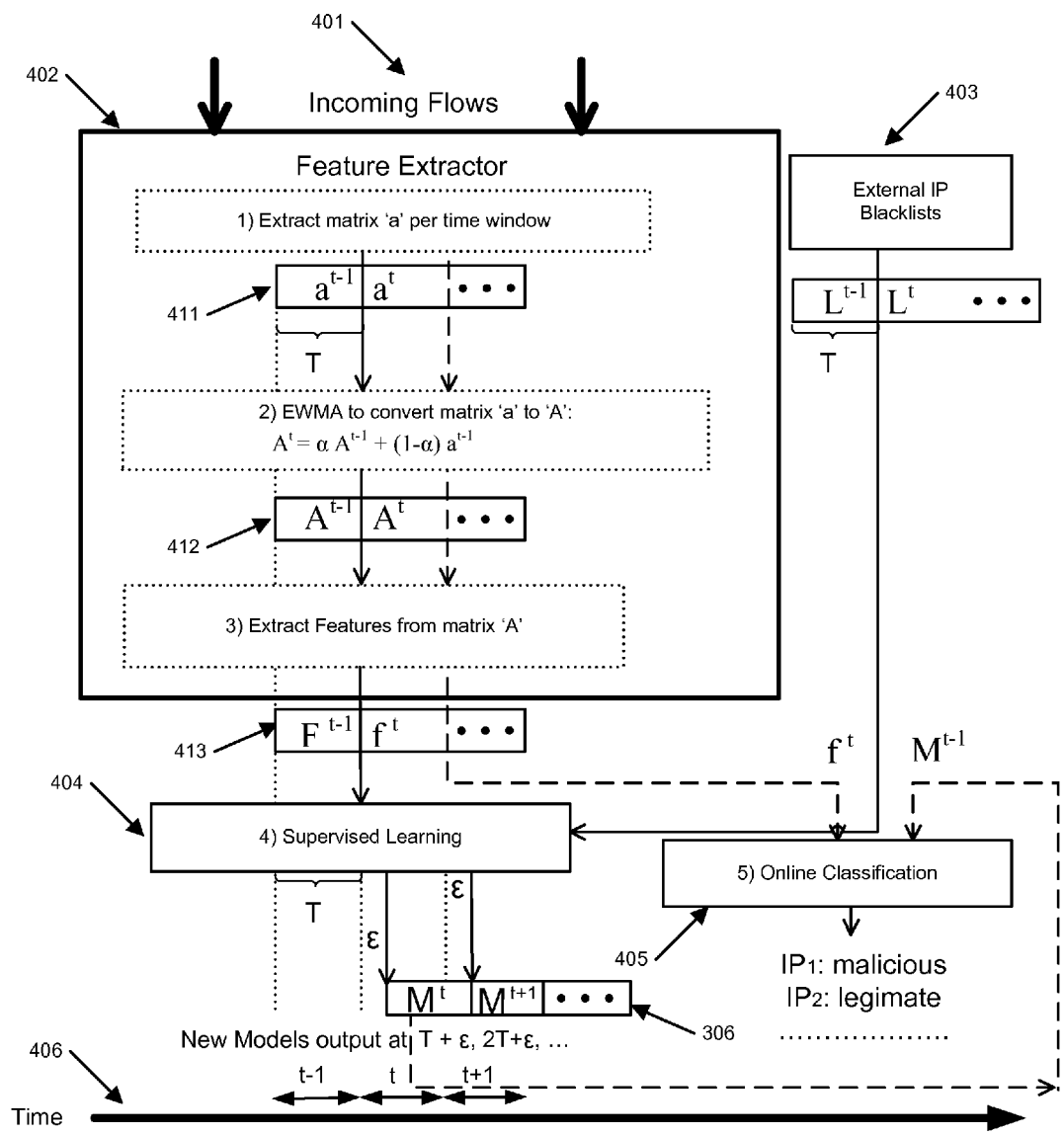
Figure 3C:
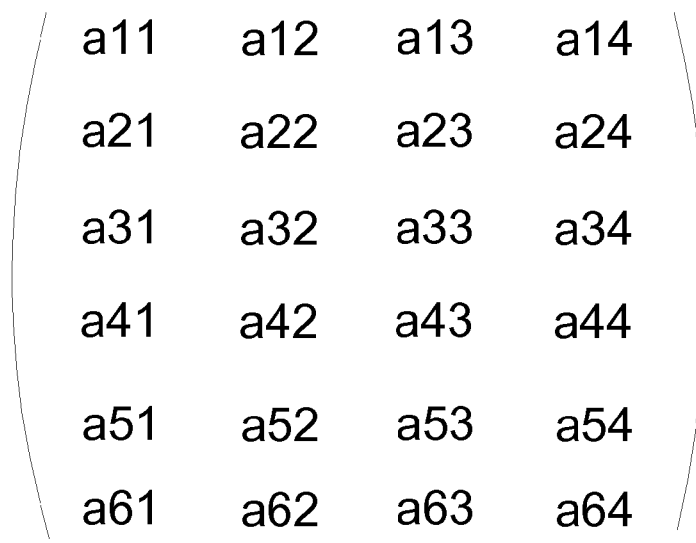
Figure 3D:
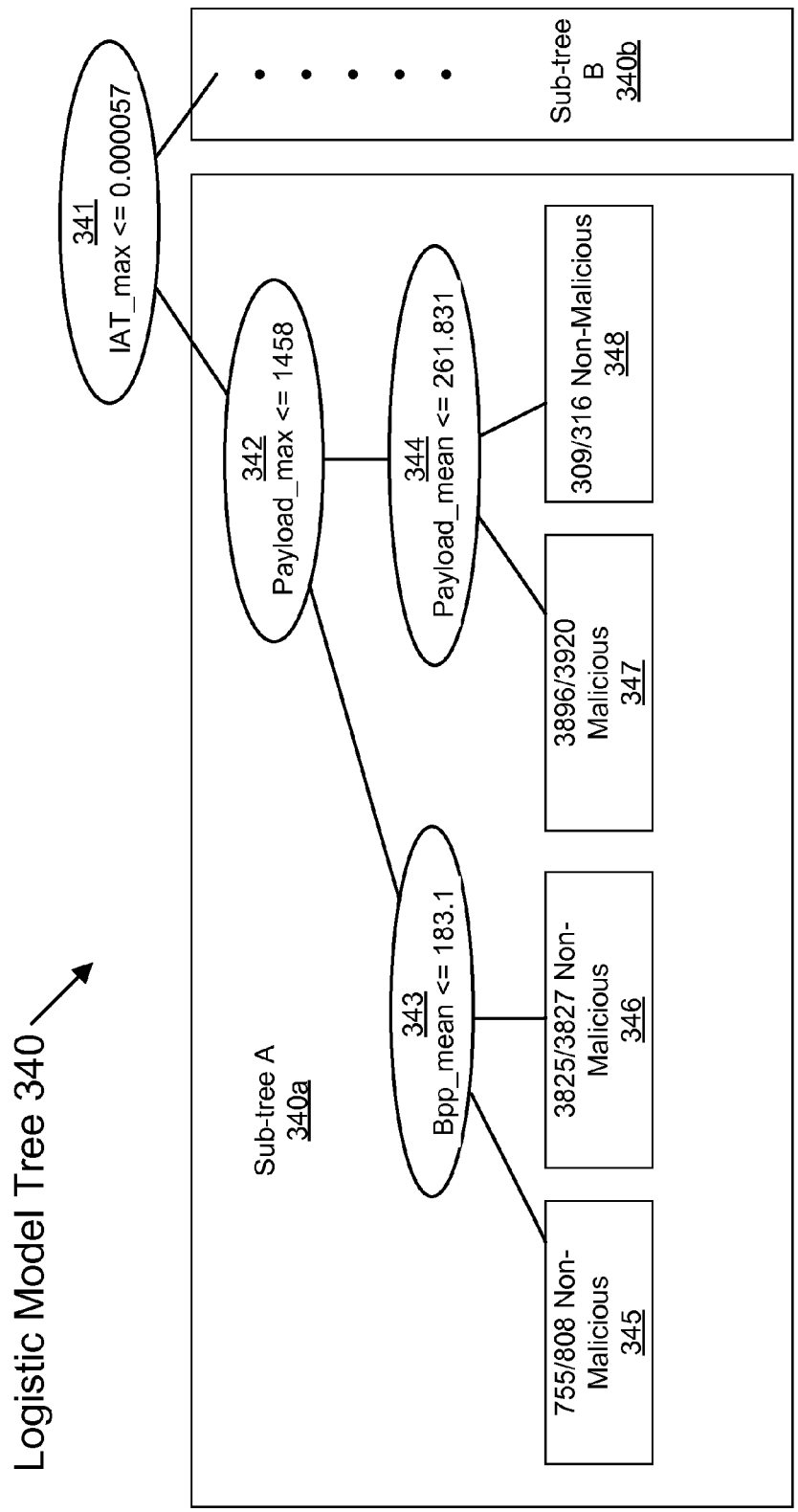

FIGS. 3A-3C depict an example in accordance with one or more embodiments of the invention. The example is based on the system and method described in FIGS. 1 and 2 above.

FIG. 3A depicts a workflow diagram of the BotWatch system (300) passively monitoring high-rate Internet traffic and continuously analyzing traffic in real-time to detect and label bots with classification results fed to database (308) and accessible by a security professional via a cyber protect portal (307). In the example of FIG. 3, the flow parser (301), offline learning module (304), online classification module (305), and cyber protect portal (307) correspond to acquisition module (123), machine learning based model generator (125), online classifier (126), and user system (140), respectively of FIG. 1. In particular, each of the offline learning module (304) and online classification module (305) includes or has access to feature extraction functionality (shown in more details in FIG. 3B below) provided by the feature extractor (124) of FIG. 1. Further, the classification model (306) is generated by the offline learning module (304) for the online classification module (305) and is essentially the same as the machine learning based model (132) of FIG. 1. In addition, the MapReduce job controller (302) and HDFS (Hadoop Distributed File System) connector (303) facilitate distributed processing performed by the offline learning module (304) and online classification module (305) using clustered computing nodes (e.g., mappers and reducers) forming the MapReduce engines depicted within the offline learning module (304) and online classification module (305). The data flow path of the network traffic data and control flow path of the distributed processing coordination are shown based on the legend (310).

To address new botnets that may appear suddenly, a key element of the BotWatch system (300) is periodic re-training of the classification model (306), such that the system evolves over time to track new botnet threats. The main system work flow path is the online classification path starting from flow parser (301) through online classification module (305) to generate classification results in database (308), with a second path which periodically freezes the network traffic into a set of historical network data for learning an updated classification model. As shown in FIG. 3, the second path starts from flow parser (301) through HDFS connector (303) and offline learning module (304) to generate the classification model (306).

FIG. 3B depicts a data flow diagram of the BotWatch system (300) described above. The inputs to the BotWatch system (300) are layer-4 flows (401) in the format of a real-time feed. Such real-time feed may be captured using a netflow device or semantic traffic analyzer (STA), which parses packets and collates packets having (associated with) the same flow tuple (e.g., defined by a source IP address, a destination IP address, etc.). The feature extractor (402) is essentially the same as the feature extractor (124) of FIG. 1 that calculates several layer-4 features in response to each new flow observed in the incoming flows (401). These extracted features are used in the supervised learning (404) to generate classification models (414) and used in the online classification (405) to label the flow tuples as malicious (i.e., associated with a bot) if classified as such based on the classification models (414). During a set time interval T, the BotWatch system uses the current inputs to relearn the classification model M in an offline fashion using the offline learning module (304). Once that model is learned, it is provided to the online portion of the BotWatch system (300) to update the online classification module (305) for performing the online classification (405). External IP address blacklists (403) of known bots provide a collection of known labels as input parameters for heuristics (i.e., algorithms) used in the supervised learning (404).

As shown, the BotWatch system (300) includes a list of IP addresses of known bots and C&C servers in the external IP blacklists (403) that may be (i) an external website that tracks botnets, (ii) output from an IPS/IDS that uses signature-based detection, or (iii) output from a honeypot designed to capture bot behaviors. In one or more embodiments, a label (e.g., malicious or legitimate) may be assigned to each IP address found in the external IP blacklists (403) based on the information contained therein. In one or more embodiments, one or more data units (e.g., flow tuples) in the historical network data is associated with a known IP address in the external IP blacklists (403) and is labeled accordingly. For example, such a flow tuple found in the historical network data may have the known IP address found in the external IP blacklists (403) as the source or destination IP address. Accordingly, such flow tuple may be labeled according to the label of the known IP address in the external IP blacklists (403). All flow tuples labeled in this manner form a variation of the external IP blacklists (403) and is used as the ground truth data set described in reference to FIGS. 1 and 2.

The IP blacklists (403) is either updated whenever the external source releases a new list, or is queried individually for each new IP address detected in the incoming flows (401). Due to the temporary nature of bots, (e.g., computer users may clean their devices and remove bots) a timestamp is assigned to each entry in the external IP blacklists (403) and stale entries are removed after a pre-determined time interval. For example, two versions of a malicious IP lists for two adjacent time intervals (denoted as t−1 and t) each with length T are denoted in FIG. 3B as $L^{t-1}$ and $L^t$. In particular, t−1 represents a time interval previous to the time interval represented by t, which is in turn previous to the time interval represented by t+1 while all three time intervals t−1, t, and t+1 are depicted along the arrow (406) representing flow of time.

The feature extractor (402) maintains data structures (e.g., feature matrix a (411) and weighted feature matrix A (412)) representing characteristics of the incoming flows (401) and calculates the features f (413) used in the supervised learning (404) and online classification (405). As noted above, the features f (413) may include bytes per second, packets per flow, inter-arrival times, etc., or combinations thereof. TABLE 1 shows 29 (including variations such as mean, variable, minimum, maximum, and standard deviation) metrics as example layer-4 features. The key functions of this module are to maintain the weighted feature matrix A (412) in a memory-efficient manner and to compute features f (413) via streaming algorithms. The feature matrix a (411) and weighted feature matrix A (412) are time dependent. For example, two versions of the feature matrix a (411) and weighted feature matrix A (412) for the two adjacent time intervals (denoted as t−1 and t) each with length T are maintained/updated in real-time and denoted in FIG. 3B as $a^{t-1}/a^t$ and $A^{t-1}/A^t$, respectively. The feature extractor (402) then uses the current values in A (412) (e.g., $A^{t-1}$ when current time is within the time interval t−1, $A^t$ when current time is within the time interval t, etc.) to calculate the features f (413) (e.g., $f^{t-1}$, $f^t$, etc.) for each flow tuple seen in the incoming flows (401) of the monitored traffic.

TABLE 1

| Metric | Description |
| --- | --- |
| bbytes | # of bytes in backward direction |
| bpkts | # of pkts in backward direction |
| bpp | Bytes Per Packet (mean, var) |
| bps | Byter Per Second (mean, var) |
| byte Ratio | # of bytes in forward/backward direction |
| fbytes | # of bytes in forward direction |
| fph | Flows Per Hour (mean, var) |
| fpkts | # of pkts in forward direction |
| fpt | Flows Per Tuple in trace duration |
| IAT | Inter-arrival time among packets in forward and backward direction (min, max, mean, stdev) |
| nbytes | Total number of bytes in trace duration |
| npkts | Total number of packets in trace duration |
| payload size | Total L4 payload size (where, L4 payload is L7 header + L7 payload) amongst all packets in both forward and reverse direction (min, max, mean, stdev) |
| packet size | Total packet size amongst all packets in both forward and reverse direction (min, max, mean, stdev) |
| pratio | Ratio of number of packets in forward/backward direction |
| ppf | Packets Per Flow (mean, var) |

In one or more embodiments, each column of the feature matrix a (411) may be a feature tuple <flow ID, feature(s)> corresponding to a particular flow tuple <source IP address, destination IP address, destination port, protocol> where feature(s) may be one of the metrics shown in TABLE 1, or a combination of multiple metrics shown in TABLE 1. For example, the combination may be in the format of simple concatenation where multiple metrics in the combination correspond to multiple rows in the feature matrix a (411). In another example, the combination may be a combined value calculated from values of multiple metrics using a pre-determined formula (e.g., bbytes+bpkts+bpp*bps, etc.). Different columns in the feature matrix a (411) then corresponds to different flow tuples observed in the incoming flows (401). The flow ID may include the entire flow tuple or a portion thereof.

FIG. 3C shows a feature matrix (330) that is an example of the feature matrix a (411). As shown, the column ($a_{11}$, $a_{21}$, $a_{31}$, $a_{41}$, $a_{51}$, $a_{61}$) represents the feature tuple. One or more element of the feature tuple is used as flow ID to identify the flow tuple corresponding to the feature tuple. For example, the flow ID may be a unique value, an index, a pointer, or a portion of the flow tuple (e.g., an IP address). In this example, $a_{11}$ is the flow ID while $a_{21}$, $a_{31}$, $a_{41}$, $a_{51}$, and $a_{61}$ represent bytes per second, packets per flow, inter-arrival time, number of bytes in backward direction, and number of packets in backward direction associated with the flow tuple. The remaining columns represent additional feature tuples corresponding to additional flow tuples. Generally, the cardinality of the feature matrix a (411) are much larger than what is shown in the example of FIG. 3C. For example, the feature matrix a (411) may contain as many columns as the number of flow tuples observed in the incoming flows (401) during a time interval. Such number of flow tuples can greatly exceeds the 4 columns in the example feature matrix (330). While the example feature matrix (330) is described in a format where different columns represent feature tuples of different flow tuples, the feature matrix (330) may also be in a transposed format where different rows represent feature tuples of different flow tuples.

The feature matrix a (411) is updated in a streaming fashion as new flows enter the system within the current time window and before they are classified. For example, the new flows may correspond to an existing flow tuple in the feature matrix a (411) in which case the cardinality of the feature matrix a (411) stay unchanged where values of the features are updated, e.g., according to how bytes per second, packets per flow, inter-arrival times, etc. are changed due to the new flows. In another example, the new flows may correspond to a new flow tuple not yet in the feature matrix a (411) in which case the cardinality of the feature matrix a (411) is increased.

Network data captured from high capacity links impose a challenge to the BotWatch system (300). Specifically, the number of unique flow tuples to keep track of can easily exceed hundreds of thousands, and hence the memory footprint may grow unbounded as the system sees more flows. The second challenge is how to avoid bias against new flow tuples which may assume smaller feature values for certain features (e.g., fpt, nbytes, npkts, etc.) compared to those flow tuples that have been seen for long periods of time. An exponentially weighted moving average (EWMA) formula is used to generate the weighted feature matrix A (412) from the feature matrix a (411). For each of consecutive time intervals of duration T, all values in matrix A (412) are scaled down as follows:

$$A^t_{i,j} = (1-\alpha)A^{t-1}_{i,j} + \alpha a^{t-1}_{i,j}$$

where $a^{t-1}_{i,j}$ indicates the matrix element of $a^{t-1}$ at row i and column j within the time interval t−1, $A^{t-1}_{i,j}$ indicates the matrix element of $A^{t-1}$ at row i and column j within the time interval t−1 $A^t_{i,j}$ indicates the matrix element of $A^t$ at row i and column j within the time interval t.

Note that the coefficient α is between 0 and 1 and represents the rate of how influences of older observations on matrix elements are discounted (higher values implies faster decay). Alternatively, α can be expressed in terms of N time periods of length T, where α=2/(N+1). For example, N=19 is equivalent to α=0.1. The statistical half-life of the weights (the interval over which the weights decrease by a factor of two) is approximately N/2.8854, which is within 1% if N>5.

In one or more embodiments, the feature f (413) (e.g., $f^{t-1}$, $f^t$, etc.) for each flow tuple is a column vector extracted from the weighted feature matrix A (412) (e.g., $A^{t-1}$, $A^t$, etc.). In one or more embodiments, the feature f (413) (e.g., $f^{t-1}$, $f^t$, etc.) for each flow tuple is an adjusted (e.g., normalized, weighted, re-arranged, or otherwise modified according to a pre-determined formula) version of the column vector extracted from the weighted feature matrix A (412) (e.g., $A^{t-1}$, $A^t$, etc.). For example, the feature f (413) (e.g., $f^{t-1}$, $f^t$, etc.) is a portion of the column vector not including the parameters of the flow tuple.

As the nature and behavior of botnets change over time, and new botnets emerge, the BotWatch system (300) relearns the classification model (306) each time interval in a sequence of time intervals (e.g., time interval t−1, time interval t, etc.). This training is done in an offline fashion, for example, in a separate server so as not to diminish online classification performance. As shown in FIG. 4, a snapshot of the feature matrix a (411) (e.g., $a^{t-1}$, $a^t$, etc.) and the list of known bots L (e.g., $L^{t-1}$, $L^t$, etc.) are provided into the supervised learning (404) at the beginning of each time interval (e.g., time interval t−1, time interval t, etc.). The computation of the classification model (306) requires time interval ϵ, where T is chosen so that T>>ϵ. For example, ϵ may be one second, one minute, etc. and T may be one day, one week, etc. The time interval ϵ may also include the computation time to extract matrices a (411), A (412) and features f (413) from the incoming flows (401). Within each time interval (e.g., time interval t, time interval t+1, etc.) at a time point delayed from the beginning of the time interval by $\epsilon$, the newly computed classification model (e.g., $M^t$, $M^{t+1}$, etc.) is provided to be used in online classification (405), replacing the previous classification model computed in the previous time interval. For example based on a time scale starting from time point 0 at the beginning of the time interval t−1, it takes from time point T through time point T+$\epsilon$ to compute $M^t$ that is used between time point T+$\epsilon$ and time point 2T+$\epsilon$ for online classification (405) before being replaced by $M^{t+1}$, which takes from time point 2T through time point 2T+$\epsilon$ to compute that is used between time point 2T+$\epsilon$ and time point 3T+$\epsilon$ for online classification (405) before being replaced by yet another newly computed classification model. Said in other words, the online classification (405) uses (i) the currently active classification model (e.g., computed at the beginning of each time interval (e.g., time interval t) by the offline supervised learning (404) based on historical network data collected during an immediately prior time interval (e.g., time interval t−1) and weighted based on the EWMA formula and (ii) the features (of the real-time network data also weighted based on the EWMA formula) extracted by the feature extractor (402) to label IP addresses observed in the incoming flows (401) during the time interval t shifted by $\epsilon$. In the example shown in FIG. 3B when the current time is within the time interval t, the historical network data is collected within the one time interval t−1 then weighted based on the EWMA formula while the real-time network data is collected within the immediate subsequent time interval t then weighted based on the EWMA formula. As time moves on along the flow (406) when the current time is now within the time interval t+1, the historical network data is collected within the one time interval t then weighted based on the EWMA formula while the real-time network data is collected within the immediate subsequent time interval t+1 then weighted based on the EWMA formula. Generally, the historical network data and the real-time network data are weighted using same value of $\alpha$. However, different values of $\alpha$ may also be used when weighting the historical network data and the real-time network data.

Initially during online classification (405), an unknown IP address from a newly identified flow tuple is quick-matched against the blacklist of known bots. If no match is found, the learned classification model is used to label the new flow tuple thereby classifying the unknown IP address. Note that IP addresses instead of individual flows are classified.

As noted above, the supervised learning (404) is performed using the machine learning based model generator (125) based on machine learning algorithms such as Logistic Regression, Decision tree, Bayesian network, Multi-layer perceptron, and Naives Bayes Tree, etc. In particular, a combination of Logistic Regression and Logistic Model Tree (a type of Decision tree) is used with both linear features and non-linear feature as described in more details with respect to FIG. 3D and TABLE 2 below. The classification model (306) generated by the machine learning based model generator (125) during supervised learning (404) may be represented as a function Y=F(X) where X represents a feature value of a flow tuple based on incoming flows (401) and Y represents a predicted label of malicious or non-malicious. In one or more embodiments, the classification model (306) is $M^t$ computed at the beginning of time interval t based on (i) a label "malicious" for a data unit (e.g., flow tuple) associated with a known botnet where the data unit (or an IP address of the data unit) is found in both the external IP blacklist $L^{t-1}$ (e.g., containing an IP address of the flow tuple) and the historical network data collected in time interval t−1 and (ii) a feature X (that describes that data unit) as calculated based on the historical network data collected in time interval t−1. As noted above, the historical network data collected in time interval t−1 my be weighted based on the EWMA formula for calculating the feature X. Based on the machine learning algorithm, the function F(X) is adjusted such that the predicted label Y matches, within a statistical range, the known label "malicious" for all data units of the historical network data that are also found in the external IP blacklist. For example, the function F(X) may be in a linear form, such as $F(X)=a*x_1+b*x_2+c*x_3$ wherein X contains 3 metrics $x_1$, $x_2$, and $x_3$. Based on the machine learning algorithm, the coefficients a, b, and C are adjusted such that $a*x_1+b*x_2+c*x_3$ matches, within a statistical range, the label "malicious" for all data units of the historical network data that are also found in the external IP blacklist.

In one or more embodiments, the machine learning algorithm uses Logistic Regression algorithm. By applying the machine learning algorithm using the Logistic Regression, the function F(X) is based on a logit function logistic curve and is adjusted such that Y matches, within a statistical range, the label "malicious" for all data units of the historical network data that are also found in the external IP blacklist. Specifically, Logistic Regression is used to rank the importance of feature metrics (e.g., the 29 feature metrics shown in TABLE 1). In particular, metrics having higher contribution in deciding if a flow is malicious or not are considered more important. Those metrics ranked with higher importance are included in forming the feature matrix a (411) and extracting the feature f (413) (e.g., $f^{t-1}$, $f^t$, etc.). The input to Logistic Regression is a set of labeled flows (i.e., ground truth data set) along with the feature values (e.g., 29 metrics show in TABLE 1) for each flow (i.e., based on the historical network data). Logistic Regression outputs the metrics (and their priorities) that have significant contribution in differentiating between a malicious and a non-malicious flow. In one or more embodiments, non-linear combinations of features (e.g., two or more of the 29 features shown in TABLE 1 that are referred to as linear features) may be added to expand the list of features used as input to the Logistic Regression. Such non-linear combinations of features are referred to as non-linear features. For example, $29C_2$ is a set of feature pairs of any two features from the 29 linear features, $29C_3$ is a set of feature tuples of any three features from the 29 linear features, etc. Logistic Regression using non-linear features is referred to as non-linear Logistic Regression.

Logistic Regression is a generalized linear model for binomial regression. It is used for prediction of probability of occurrence of an event. It predicts by fitting data to a logistic curve. Consider a flow having a label Y where Y=1 indicates a non-malicious flow and Y=0 indicates a malicious flow. Further, the flow has a feature value based on the metrics defined in a set X={$x_1, x_2, \ldots, x_C$}, where each $x_i$ may be one or more of the 29 metrics shown in TABLE 1 above. A logistic function is defined as f(z)=P(Y=1|X=x) where P is the probability function, lower case x represents a set of particular feature values of $x_1, x_2, \ldots, x_C$, and z is a logit defined by $f(z)=1/(1+e^{-Z})$. As is known to those skilled in the art, the symbol | represents the term "given". For the particular feature values of $x_1, x_2, \ldots, x_C$, $f(z)=1/(1+e^{-Z})$ is 1 (i.e., 100%) when the flow is a non-malicious flow, i.e., the probability is 100% for Y=1 given X=x while $f(z)=1/(1+e^{-Z})$ is 0 (i.e., 0%) when the flow is a malicious flow, i.e., the probability is 0% for Y=1 given X=x. For a given feature values of $x_1, x_2, \ldots, x_C$, z may be represented as a linear approximation given by $z=\beta_0+\beta_1*x_1+\beta_2*x_2+\ldots+\beta_C*x_C$. $\beta_0$ is called the intercept and $\beta_i$'s are called regression coefficient associated with each $x_i$ metric. Each regression coefficient describes the extent of contribution of that particular metric $x_i$. A positive regression coefficient means that the particular $x_i$ metric contributes to probability of outcome of 1 indicating the metric contributes to classify the flow as a non-malicious flow. Similarly a negative regression coefficient means that the particular $x_i$ metric contributes to probability of outcome of 0, indicating the metric contributes to classify the flow as a malicious flow. A regression coefficient of 0 indicates that the particular metric has no effect in labeling the flow. A large absolute value of regression coefficient indicates that particular metric strongly influences the decision process of the logistic function. In one or more embodiments, Logistic Regression techniques are applied to determine the values of $\beta i$'s and relative importance of corresponding metrics $x_i$.

In one or more embodiments, Elastic Net techniques are used in conjunction with Logistic Regression techniques (referred to as Elastic Net regularized Logistic Regression) to learn the values of $\beta_i$'s that maximize the value of the expression below:

$$\left\{ \sum_{i=1}^{|T|} y_i(\beta_0 + \beta_j x_j) - \log(1 + \exp^{\beta_0 + \beta_j x_j}) - \lambda \sum_{j \in F} \alpha |\beta_j| + \frac{1-\alpha}{2} \beta_j^2 \right\}$$

Here, $\alpha$ and $\lambda$ are hyper parameters with value within the range of [0, 1]. These hyper parameters allow a trade-off between L1-regularization ($\alpha=1$) and L2-regularization ($\alpha=0$) to lower test prediction errors compared to the non-regularized Logistic Regression (without Elastic Net). When there are multiple features which are correlated with each other, then L1-regularization randomly selects one of them while forcing the coefficients for others to zero. This has the advantage that the noisy features can be removed while selecting the more important features, however, in the case of correlated features, the risk exists in removing equally important features. In contrast, L2-regularization never forces any coefficient to zero, and in the presence of multiple correlated features, it would select all of them while assigning each of them equal weights. Thus, the hyper parameter $\alpha$ can be adjusted at values other than 0 or 1 to keep the desirable characteristics of both L1- and L2-regularization. In one or more embodiments, non-linear terms may also be added to the expression above for performing non-linear logic regression.

In one or more embodiments, the machine learning algorithm uses a Decision Tree, which is a collection of classifier. During the training process a decision tree is built with its internal nodes correspond to different attributes (e.g., feature metrics) of the data samples (e.g., data units in the network trace). Each of such internal nodes split the training samples (i.e., historical network data) according to the value of that attribute. Ideally at each leaf node there should contain only data samples from a single class (i.e., malicious class or non-malicious class). Then given a new data sample (i.e., data unit in real time network data), its attributes will be checked against starting from the root of the tree, until it arrives to one of the leaf node, where its class (i.e., label) will be determined. For example, J48 is a decision tree learning algorithm known to those skilled in the art. An Alternating Decision Tree (ADTree) is a generalization of Decision Tree and has connections to boosting algorithms of machine learning. By applying the machine learning algorithm using the Decision Tree or Alternating Decision Tree, the function F(X) is based on the decision tree and is adjusted such that Y matches, within a statistical range, the label "malicious" for all data units of the historical network data that are also found in the external IP blacklist.

Logistic Model Tree (LMT) is a machine learning algorithm based on combining Logistic Regression and Decision Tree. The input to LMT is a set of labeled flows (i.e., ground truth data set) along with the feature values (e.g., 29 metrics show in TABLE 1) for each flow (i.e., based on the historical network data). LMT algorithm outputs a LMT where each internal node splits the data sample (i.e., the data units in the network data) to two separate paths (ie., sub-tree A (340a) and sub-tree B (340b)) while each leaf node includes a subset of data sample applied as input to individual Logistic Regression. FIG. 4 shows an example LMT (340) including root node (341) where the feature IAT_max is determined to be the most important feature and splits the network data units based on a threshold of 0.000057. Similarly, internal nodes (342), (343), and (344) each are prioritized features (i.e., Payload_max, bpp_mean, Payload_mean, respectively) further splitting data units based on the thresholds of 1458, 183.1, and 261.831, respectively. The leaf nodes (345) through (348) capture subsets of the data units that are used as input to individual Logistic Regression. For example, leaf node (345) captured total 808 data units of which 755 data units are labeled as non-malicious from the Logistic Regression. Similarly, leaf node (346) captured total 3827 data units of which 38255 data units are labeled as non-malicious from the Logistic Regression, leaf node (347) captured total 3920 data units of which 38296 data units are labeled as malicious from the Logistic Regression, and leaf node (348) captured total 316 data units of which 309 data units are labeled as non-malicious from the Logistic Regression.

In one or more embodiments, the machine learning algorithm uses a Bayesian network. Given a set of variables $U=\{x_1 \ldots x_k\}$ representing the metrics $x_1 \ldots x_k$ used in defining the feature X, the Bayesian network for the machine learning based model generator (125) is a network structure that consists of a directed acyclic graph (DAG) over U and a set of associated probability tables. By applying the machine learning algorithm using the Bayesian network, the function F(X) is based on the Bayesian network and is adjusted such that Y matches, within a statistical range, the label "malicious" for all data units of the historical network data that are also found in the external IP blacklist.

In one or more embodiments, the machine learning algorithm uses a multilayer perceptron (MLP), which is an artificial neural network consisting of multiple layers of nodes in a directed graph, fully connected from one layer to the next. Except for the input nodes, each node in the MLP is a neuron (i.e., processing element) with a nonlinear activation function. MLP utilizes a supervised learning technique called backpropagation for training the network, and maps sets of input data onto a set of appropriate output. MLP is a modification of standard linear perceptron, which can separate data that is not linearly separable. By applying the machine learning algorithm using the MLP, the function F(X) is based on the artificial neural network and is adjusted such that Y matches, within a statistical range, the label "malicious" for all data units of the historical network data that are also found in the external IP blacklist.

In one or more embodiments, the machine learning algorithm uses a Naive Bayes Tree, which is a hybrid of decision-tree classifiers and Naive-Bayes classifiers. In particular, the decision-tree nodes contain univariate splits as regular decision-trees, but the leaves contain Naive-Bayesian classifiers. By applying the machine learning algorithm using the Naive Bayes Tree, the function F(X) is based on the decision tree and is adjusted such that Y matches, within a statistical range, the label "malicious" for all data units of the historical network data that are also found in the external IP blacklist.

Figure 4:
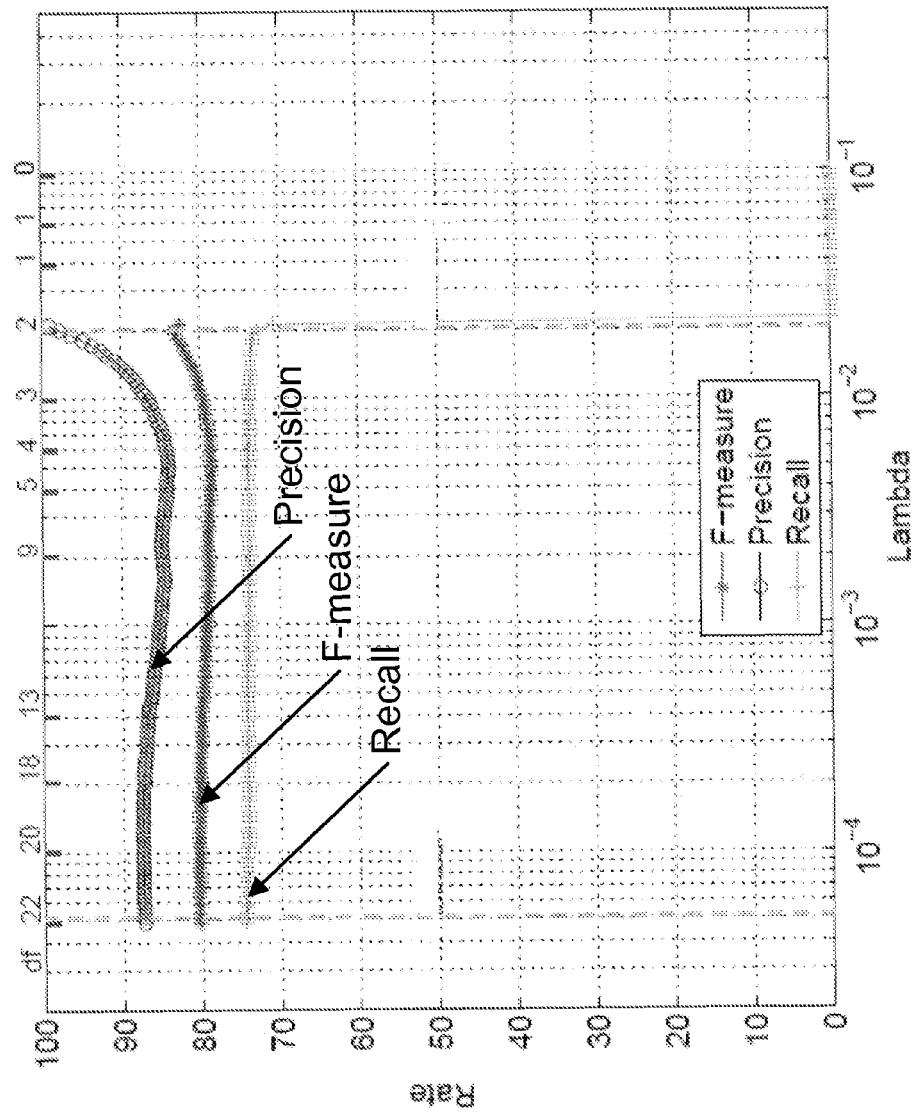
FIG. 4 shows model prediction accuracy of an example according to aspects of the invention

FIG. 4 shows model prediction accuracy statistics using linear Logistic Regression based on an example data set with known labels. The example data includes Botnet flow tuples mixed with legitimate HTTP flow tuples. As shown in FIG. 4, the model prediction accuracy is represented in terms of Precision, Recall, and F-measure across various values of the parameter $\lambda$ where Precision=number of accurate bot detection/total number of bots detected, Recall=number of accurate bot detection/actual number of bots, and F-measure is defined as a geometric mean of Recall and Precision as follows:

$$F=(2*Recall*Precision)/(Recall+Precision).$$

TABLE 2 below shows the 29 linear features (also listed in TABLE 1 above) used in the linear Logistic Regression and the coefficients assigned to each of the 29 feature metrics for a model with minimum best $\lambda$ value and different $\alpha$ values.

TABLE 2

| Metric | $\alpha = 0$ | $\alpha = 0.95$ | $\alpha = 1$ |
|---|---|---|---|
| bbytes | 0.000000 | 0.000000 | 0.000000 |
| bpkts | 0.000058 | 0.000282 | 0.000202 |
| bpp mean | 0.001136 | 0.018884 | 0.019011 |
| bpp var | 0.000002 | −0.000009 | −0.000010 |
| bps mean | 0.000000 | 0.000000 | 0.000000 |
| bps var | 0.000000 | 0.000000 | 0.000000 |
| byte ratio | −0.000000 | −0.000000 | −0.000000 |
| fbytes | 0.000001 | 0.000059 | 0.000067 |
| fph mean | 0.001648 | −0.134612 | −0.280526 |
| fph var | 0.000000 | 0.000207 | 0.000278 |
| fpkts | 0.000088 | 0.000000 | 0.000000 |
| fpt | 0.000073 | −0.005854 | −0.001193 |
| IAT max | −0.002089 | −0.003793 | −0.003810 |
| IAT mean | 0.002350 | 0.014724 | 0.014850 |
| IAT min | 0.000321 | −0.010658 | −0.010825 |
| IAT stdev | 0.003287 | 0.036062 | 0.036249 |
| num bytes | 0.000000 | 0.000000 | 0.000000 |
| num pkts | 0.000037 | 0.000000 | 0.000000 |
| Payload max | −0.000215 | −0.001174 | −0.001860 |
| Payload mean | 0.000216 | 0.000890 | 0.001783 |
| Payload min | 0.000096 | 0.000258 | 0.000483 |
| Payload stdev | 0.000363 | 0.001807 | 0.003169 |
| Pkt max | −0.000215 | −0.001169 | −0.000490 |
| Pkt mean | 0.000216 | 0.000884 | 0.000000 |
| Pkt min | 0.000096 | 0.000250 | 0.000028 |
| pkt ratio | −0.000000 | −0.000000 | −0.000000 |
| Pkt stdev | 0.000363 | 0.001800 | 0.000449 |
| ppf mean | 0.000024 | 0.000000 | 0.000000 |
| ppf var | 0.000000 | 0.000000 | 0.000000 |

Although specific formats, structures, or partitions are used as examples in the foregoing description regarding the various components in the malicious node classification tool, user system, and computer network, one skilled in the art, with the benefit of this disclosure, would recognize that other formats or structures may also be used in the system, methods, and examples described without deviating from the spirit of the invention. For example, the format of a matrix may be transposed such that rows become columns and vice versa. In another example, different formats of flow tuple may be used to represents layer-4 flows.

Figure 5:
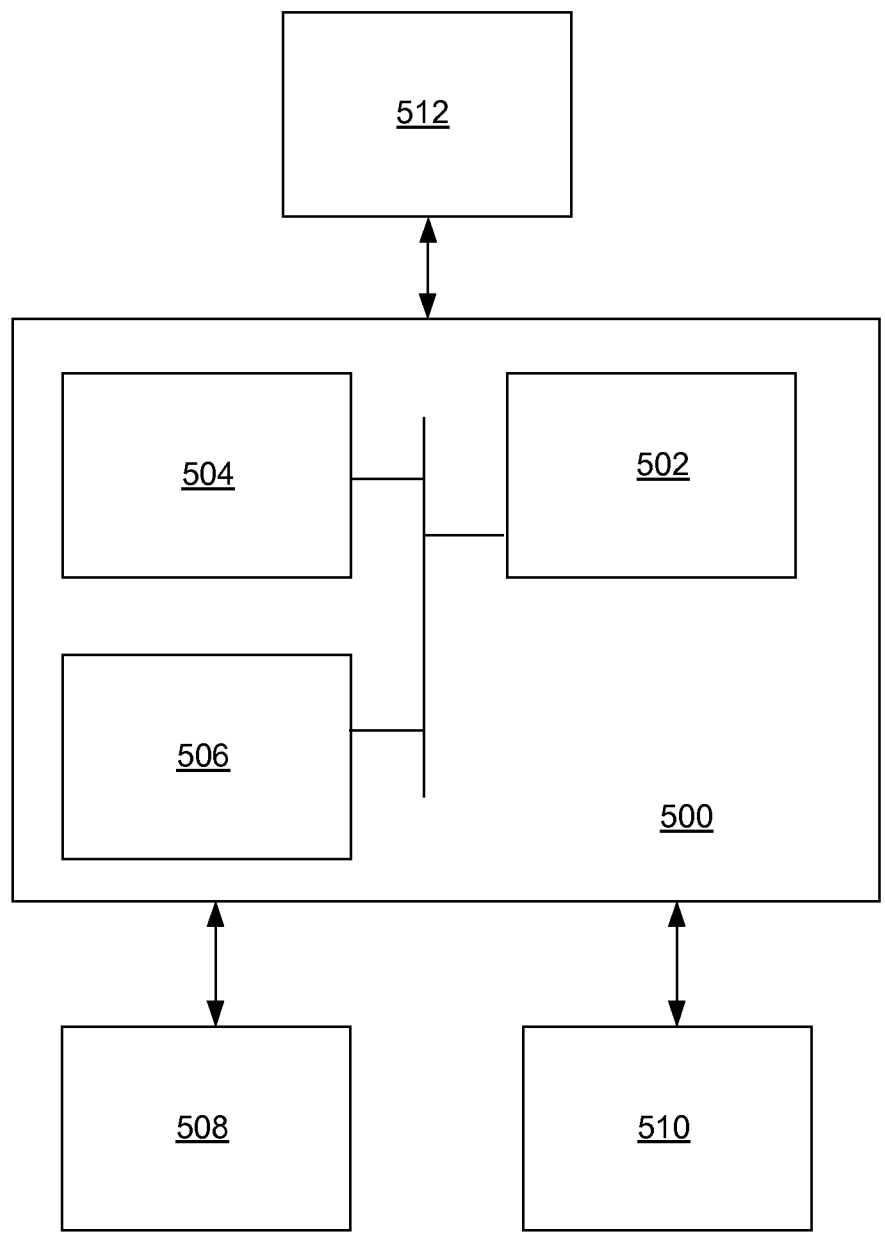
FIG. 5 shows a computer system according to aspects of the invention.

Embodiments of the invention may be implemented on virtually any type of computer regardless of the platform being used. For example, as shown in FIG. 5, a computer system (500) includes one or more processor(s) (502) (e.g., central processing unit or CPU), associated memory (504) (e.g., random document access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor) for example to display various results such as the feature vectors, the principal components, the application space, the signatures, etc. The computer system (500) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying a botnet in a network, comprising:
obtaining historical network data in the network, the historical network data comprising a first plurality of data units;
obtaining a ground truth data set associated with the historical network data, the ground truth data set comprising a plurality of labels with each label assigned to a corresponding data unit of the first plurality of data units, said each label comprising one of a first label categorizing said corresponding data unit as associated with the botnet and a second label categorizing said corresponding data unit as not associated with the botnet;
analyzing, by a central processing unit (CPU) of a computer and using a machine learning algorithm, the historical network data and the ground truth data set to generate a model comprising a decision tree and a plurality of functions each associated with one of a plurality of leaf nodes of the decision tree, wherein the decision tree comprises the plurality of leaf nodes, a first non-leaf node, and a second non-leaf node downstream from the first non-leaf node, wherein the historical network data is applied as input to the decision tree and is split while traversing the decision tree, wherein the first non-leaf node splits a first portion of the historical network data to traverse two paths of the decision tree, wherein the first portion of the historical network data is split based on a packet inter-arrival time statistics of the first plurality of data units, wherein the second non-leaf node splits a second portion of the historical network data traversing one of the two paths of the decision tree to the second non-leaf node, wherein the second portion of the historical network data is split based on at least one selected from a group consisting of a layer-4 payload size statistics and a number of bytes per packet statistics of the first plurality of data units, wherein each of the plurality of functions outputs a first statistical prediction of the plurality of labels assigned to a third portion of the historical network data traversing the decision tree to a corresponding leaf node of the plurality of leaf nodes, wherein the machine learning algorithm adjusts the model to match the first statistical prediction to the ground truth data set;

obtaining real-time network data in the network, the real-time network data comprising a second plurality of data units;

applying the second plurality of data units as the input to the decision tree to output a second statistical prediction of the plurality of labels assigned to a second data unit of the second plurality of data units; and categorizing the second data unit as associated with the botnet based on the second statistical prediction.

2. The method of claim 1, wherein the first plurality of data units comprise a plurality of flow tuples, each tuple comprising a source IP address, a destination IP address, a destination port, and a protocol identifier.

3. The method of claim 2, wherein the packet inter-arrival time statistics, the layer-4 payload size statistics, and the number of bytes per packet statistics are time dependent and comprise a first set of values corresponding to a first version of the historical network data within a first time window and a second set of values corresponding to a second version of the historical network data within a second time window, wherein analyzing the historical network data comprises:
representing the first and second sets of values as first and second matrices; and
generating a time averaged matrix from the first and second matrices based on a pre-determined statistical formula,
wherein the historical network data is split based on the time averaged matrix while traversing the decision tree.

4. The method of claim 3, wherein the pre-determined statistical formula comprises exponentially weighted moving average (EWMA).

5. The method of claim 1, wherein the machine learning algorithm comprises Multi-layer perceptron.

6. A system for identifying a botnet in a network, comprising:
a processor; and
memory storing instructions, when executed by the processor, comprising functionalities for:
obtaining historical network data in the network, the historical network data comprising a first plurality of data units;
obtaining a ground truth data set associated with the historical network data, the ground truth data set comprising a plurality of labels with each label assigned to a corresponding data unit of the first plurality of data units, said each label comprising one of a first label categorizing said corresponding data unit as associated with the botnet and a second label categorizing said corresponding data unit as being not associated with the botnet;
analyzing, using a machine learning algorithm, the historical network data and the ground truth data set to generate a model comprising a decision tree and a plurality of functions each associated with one of a plurality of leaf nodes of the decision tree, wherein the decision tree comprises the plurality of leaf nodes, a first non-leaf node, and a second non-leaf node downstream from the first non-leaf node, wherein the historical network data is applied as input to the decision tree and is split while traversing the decision tree, wherein the first non-leaf node splits a first portion of the historical network data to traverse two paths of the decision tree, wherein the first portion of the historical network data is split based on a packet inter-arrival time statistics of the first plurality of data units, wherein the second non-leaf node splits a second portion of the historical network data traversing one of the two paths of the decision tree to the second non-leaf node, wherein the second portion of the historical network data is split based on at least one selected from a group consisting of a layer-4 payload size statistics and a number of bytes per packet statistics of the first plurality of data units, wherein each of the plurality of functions outputs a first statistical prediction of the plurality of labels assigned to a third portion of the historical network data traversing the decision tree to a corresponding leaf node of the plurality of leaf nodes, wherein the machine learning algorithm adjusts the model to match the first statistical prediction to the ground truth data set;
obtaining real-time network data in the network, the real-time network data comprising a second plurality of data units;
applying the second plurality of data units as the input to the decision tree to output a second statistical prediction of the plurality of labels assigned to a second data unit of the second plurality of data units; and
categorizing the second data unit as associated with the botnet based on the second statistical prediction.

7. The system of claim 6, wherein the first plurality of data units comprise a plurality of flow tuples, each tuple comprising a source IP address, a destination IP address, a destination port, and a protocol identifier.

8. The system of claim 7, wherein the packet inter-arrival time statistics, the layer-4 payload size statistics, and the number of bytes per packet statistics are time dependent and comprise a first set of values corresponding to a first version of the historical network data within a first time window and a second set of values corresponding to a second version of the historical network data within a second time window, wherein analyzing the historical network data comprises:
representing the first and second sets of values as first and second matrices; and
generating a time averaged matrix from the first and second matrices based on a pre-determined statistical formula, wherein the historical network data is split based on the time averaged matrix while traversing the decision tree.

9. The system of claim 8, wherein the pre-determined statistical formula comprises exponentially weighted moving average (EWMA).

10. The system of claim 6, wherein the machine learning algorithm comprises Multi-layer perceptron.

11. A non-transitory computer readable medium storing instructions for identifying a botnet in a network, the instructions, when executed by a processor of a computer, comprising functionality for:
　　obtaining historical network data in the network, the historical network data comprising a first plurality of data units;
　　obtaining a ground truth data set associated with the historical network data, the ground truth data set comprising a plurality of labels with each label assigned to a corresponding data unit of the first plurality of data units, said each label comprising one of a first label categorizing said corresponding data unit as associated with the botnet and a second label categorizing said corresponding data unit as not associated with the botnet;
　　analyzing, using a machine learning algorithm, the historical network data and the ground truth data set to generate a model comprising a decision tree and a plurality of functions each associated with one of a plurality of leaf nodes of the decision tree, wherein the decision tree comprises the plurality of leaf nodes, a first non-leaf node, and a second non-leaf node downstream from the first non-leaf node, wherein the historical network data is applied as input to the decision tree and is split while traversing the decision tree, wherein the first non-leaf node splits a first portion of the historical network data to traverse two paths of the decision tree, wherein the first portion of the historical network data is split based on a packet inter-arrival time statistics of the first plurality of data units, wherein the second non-leaf node splits a second portion of the historical network data traversing one of the two paths of the decision tree to the second non-leaf node, wherein the second portion of the historical network data is split based on at least one selected from a group consisting of a layer-4 payload size statistics and a number of bytes per packet statistics of the first plurality of data units, wherein each of the plurality of functions outputs a first statistical prediction of the plurality of labels assigned to a third portion of the historical network data traversing the decision tree to a corresponding leaf node of the plurality of leaf nodes, wherein the machine learning algorithm adjusts the model to match the first statistical prediction to the ground truth data set;
　　obtaining real-time network data in the network, the real-time network data comprising a second plurality of data units;
　　applying the second plurality of data units as the input to the decision tree to output a second statistical prediction of the plurality of labels assigned to a second data unit of the second plurality of data units; and
　　categorizing the second data unit as associated with the botnet based on the second statistical prediction.

12. The non-transitory computer readable medium of claim 11, wherein the first plurality of data units comprise a plurality of flow tuples, each tuple comprising a source IP address, a destination IP address, a destination port, and a protocol identifier.

13. The non-transitory computer readable medium of claim 12,
　　wherein the packet inter-arrival time statistics, the layer-4 payload size statistics, and the number of bytes per packet statistics are time dependent and comprise a first set of values corresponding to a first version of the historical network data within a first time window and a second set of values corresponding to a second version of the historical network data within a second time window,
　　wherein analyzing the historical network data comprises:
　　　　representing the first and second sets of values as first and second matrices; and
　　　　generating a time averaged matrix from the first and second matrices based on a pre-determined statistical formula,
　　　　wherein the historical network data is split based on the time averaged matrix while traversing the decision tree.

14. The non-transitory computer readable medium of claim 13, wherein the pre-determined statistical formula comprises exponentially weighted moving average (EWMA).

15. The non-transitory computer readable medium of claim 11, wherein the machine learning algorithm comprises Multi-layer perceptron.

* * * * *